United States Patent
Chen et al.

(10) Patent No.: US 12,450,897 B1
(45) Date of Patent: Oct. 21, 2025

(54) INTELLIGENT FUSION AND PROCESSING METHOD FOR REMOTE SENSING PRODUCTS FOR WATER QUALITY MONITORING OF ESTUARIES AND BAYS

(71) Applicant: XIAMEN UNIVERSITY, Xiamen (CN)

(72) Inventors: Nengwang Chen, Xiamen (CN); Lingling Li, Xiamen (CN); Caiyun Zhang, Xiamen (CN); Xiaolong Yu, Xiamen (CN); Shuiying Huang, Xiamen (CN); Shaobin Li, Xiamen (CN); Zhongyao Liang, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 0 days.

(21) Appl. No.: 19/026,529

(22) Filed: Jan. 17, 2025

(30) Foreign Application Priority Data

Dec. 4, 2023 (CN) .......................... 202311646337.5

(51) Int. Cl.
*G06V 20/13* (2022.01)
*G06V 10/80* (2022.01)
*G06V 10/82* (2022.01)

(52) U.S. Cl.
CPC .............. *G06V 20/13* (2022.01); *G06V 10/80* (2022.01); *G06V 10/82* (2022.01)

(58) Field of Classification Search
CPC ......... G06V 20/13; G06V 10/80; G06V 10/82
See application file for complete search history.

(56) References Cited

U.S. PATENT DOCUMENTS

2019/0034725 A1   1/2019   Tyburski et al.

FOREIGN PATENT DOCUMENTS

| CN | 108195767 A | * | 6/2018 | ............. G01N 21/17 |
| CN | 109581372 A | * | 4/2019 | ............. G01S 13/89 |

(Continued)

OTHER PUBLICATIONS

Li Zhang, et al., Valley Water Rescource Environment System: Design and Realization, Bulletion of Surveying and Mapping, 2004, pp. 50-53, vol. 2.

(Continued)

*Primary Examiner* — Ross Varndell
(74) *Attorney, Agent, or Firm* — Bayramoglu Law Offices LLC

(57) ABSTRACT

An intelligent fusion and processing method for remote sensing products for water quality monitoring of estuaries and bays includes: S1. setting criteria for image retrieval, performing iterative image retrieval and downloading, and achieving batch downloading of remote sensing images automatically; S2. performing recursive call of an Acolite settings file in Python to directly perform batch atmospheric correction of multi-source remote sensing satellite data; S3. fusing multi-source remote sensing data products based on machine learning to generate a layer of high-frequency water quality parameter remote sensing products; S4. superimposing a layer of tidal boundary vectors for different water levels onto the layer of water quality parameter remote sensing products, and adding map elements to generate a thematic map of different water quality parameters; S5. performing intelligent statistical analysis of water quality parameters; and S6. outputting a report sheet based on the thematic map of water quality parameters and the statistical chart.

2 Claims, 2 Drawing Sheets

(56) References Cited

FOREIGN PATENT DOCUMENTS

| | | | | | |
|---|---|---|---|---|---|
| CN | 110967461 | A | | 4/2020 | |
| CN | 111695530 | A | * | 9/2020 | |
| CN | 112100301 | A | * | 12/2020 | |
| CN | 112464746 | A | * | 3/2021 | ............ G01N 33/18 |
| CN | 113324923 | A | | 8/2021 | |
| CN | 114384015 | A | * | 4/2022 | |
| CN | 115457402 | A | * | 12/2022 | |
| CN | 116308094 | A | | 6/2023 | |
| CN | 116503755 | A | * | 7/2023 | |
| CN | 117422987 | A | * | 1/2024 | |
| KR | 101821974 | B1 | | 1/2018 | |

OTHER PUBLICATIONS

Mingguan Wu, et al., Land-sourced Sewage Outfalls Monitoring in Circum-Bohai Region Using Multi-scale Remote Sensing Data, Journal of Geo-Information Science, 2012, pp. 405-410, vol. 14 No. 3.

* cited by examiner

INTELLIGENT FUSION AND PROCESSING METHOD FOR REMOTE SENSING PRODUCTS FOR WATER QUALITY MONITORING OF ESTUARIES AND BAYS

CROSS REFERENCE TO RELATED APPLICATION

This application is based upon and claims priority to Chinese Patent Application No. 202311646337.5, filed on Dec. 4, 2024, the entire content of which is incorporated herein by reference.

TECHNICAL FIELD

The present disclosure relates to the technical field of data processing of water quality, and specifically relates to an intelligent fusion processing method for remote sensing products for water quality monitoring of estuaries and bays.

BACKGROUND

Estuaries and bays are regions where marine and terrestrial ecosystems interact significantly. Water environment parameters (such as inorganic nitrogen, reactive phosphate, chlorophyll-a concentration, transparency and the like) are critical indicators of eutrophication and ecological health, and also core parameters for water quality monitoring. Therefore, in ecological environment management of estuaries and bays, there is a high demand for time-sensitive and high-precision water environment monitoring data and products.

Water environment parameters of estuaries and bays exhibit significant spatiotemporal dynamics and spatial variability. Developing more efficient water environment monitoring technologies based on satellite remote sensing is an inevitable trend. Currently, operational data and products such as MODIS global sea surface temperatures and chlorophyll-a concentrations are made public on a daily basis, but their resolutions are all at a kilometer scale, with a serious loss of data about water quality monitoring of estuarine and bay regions. Medium-to-high-spatial-resolution data and products, such as Landsat-derived sea surface temperatures, are subjected to a revisit period of 16 d, resulting in low timeliness. Currently available data and products fail to meet operational application requirements for refined monitoring and assessment of estuarine and bay water environments. At present, no operationalized, high-spatial-resolution, high-timeliness, long time-series intelligent production technology for water quality parameter remote sensing products have been developed domestically or internationally. To meet the needs for both emergency monitoring and routine monitoring and evaluation, it is crucial to establish an intelligent fusion and processing method for remote sensing products for water quality monitoring of estuaries and bays.

SUMMARY

An objective of the present disclosure is to provide an intelligent fusion and processing method for remote sensing products for water quality monitoring of estuaries and bays. This method enables efficient batch downloading of remote sensing images automatically, highly adaptable automatic atmospheric correction, multi-source remote sensing data product fusion, intelligent generation of thematic maps, intelligent statistical analysis of water quality parameters, and automated report generation. This method is obviously advantageous in monitoring and assessing aquatic environments in coastal and bay areas, enhancing the efficiency of generating water quality parameter remote sensing products and supporting improvement of information services and decision-making processes.

To achieve the above objective, the present disclosure adopts the following technical solution:

An intelligent fusion and processing method for remote sensing products for water quality monitoring of estuaries and bays, including the following steps:

S1. setting criteria for image retrieval, performing iterative retrieval and downloading, and achieving batch automatic downloading of remote sensing images;

a specific process of S1 includes:

S11. setting retrieval criteria: using Python and the Sentinelsat, Landsatxplore, and Selenium packages to batch download high spatial and temporal resolution multi-source remote sensing satellite data; the remote sensing satellite data is sourced from Sentinel-2, Sentinel-3, Landsat, GOCI2, and VIIRS; when logging into a download website automatically after inputting a valid account and password, a user can retrieve any required product according to the retrieval criteria;

S12. performing iterative retrieval and downloading: performing plurality of rounds of activation and downloading until all required data are downloaded, and then terminating the process; for each round of retrieval and downloading, recording IDs of downloaded products, and in a next round of downloading, removing the IDs, and retrieving and downloading from the IDs of offline products that have not been activated, thereby improving the efficiency of downloading in the whole process;

S2. performing recursive call of an Acolite settings file in Python to directly perform batch atmospheric correction of multi-source remote sensing satellite data;

S3. fusing multi-source remote sensing data products based on machine learning to generate a layer of high-frequency water quality parameter remote sensing products;

S4. superimposing a layer of tidal boundary vectors for different water levels onto the layer of water quality parameter remote sensing products, and adding map elements to generate a thematic map of water quality parameters;

S5. performing intelligent statistical analysis of water quality parameters to generate a statistical chart; and S6. automatically outputting a report sheet based on the thematic map of water quality parameters and the statistical chart.

Preferably, in the S11: the spatial resolution of remote sensing satellite data from Sentinel-2 is 10 m, with a temporal resolution of 5 d; the spatial resolution of remote sensing satellite data from Sentinel-3 is 300 m, with a temporal resolution of 5 d; the spatial resolution of remote sensing satellite data from Landsat is 30 m, with a temporal resolution of 16 d; the spatial resolution of remote sensing satellite data from GOCI2 is 250 m, with an hourly temporal resolution; the spatial resolution of remote sensing satellite data from VIIRS is 750 m, with a daily temporal resolution; the criteria for image retrieval include date, spatial region, satellite, product type, and cloud cover.

Preferably, in the S2, a specific process of setting parameters in the settings file is as follows:

S21. selecting input: choosing an input directory and files for processing;

S22. selecting output: choosing an output directory;

S23. setting an area of interest: entering boundaries to be processed and storing them in a vector file in a shapefile format;

S24. setting L2W parameters: listing required output parameters; when the output parameters are null, only L1R and L2R files will be generated; selecting Rrs_*, to output remote sensing reflectance;

S25. setting a target resolution: setting the resolution for each satellite;

S26. setting whether to mask land areas: by default, the land areas are masked;

S27. setting wind speed-based interface reflectance correction: on;

S28. setting residual sunlight reflectance correction: on;

S29. setting PNG output: using top-of-atmosphere ρt or ρs reflectance to generate RGB composite checkboxes and L2W parameter PNG maps;

setting an image resolution: 300 dpi;

setting whether to include a PNG map scale: yes;

setting a PNG map scale color: white.

Preferably, a specific process of the S3 is as follows: based on machine learning, fusing high-spatial-resolution and low-temporal-resolution remote sensing data products with low-spatial-resolution and high-temporal-resolution remote sensing data products, supplementing this with water quality parameter information as input to the machine learning model to generate a layer of high-frequency water quality parameter remote sensing products, wherein the water quality parameter information includes a satellite angle, a wind speed, and an air temperature, and the layer of water quality parameter remote sensing products include turbidity, water temperature, chlorophyll-a, inorganic nitrogen, and reactive phosphate.

Preferably, a specific process of the S4 is as follows:

S41. matching a tidal table according to time of shooting the remote sensing images, calculating water level heights corresponding to extracted high tide, mid-tide, and low tide boundaries, superimposing the tidal boundary vector layer onto the layer of water quality parameter remote sensing products;

S42. adding map elements and other labels to generate a thematic map of water quality parameters for estuary and bay boundaries with higher accuracy, where the map elements include transportation networks, major administrative markers, scale bars, and north arrows.

Preferably, a specific process of the S5 is as follows:

S51. selecting an area of interest: the user selects the area of interest using GIS map tools or chooses a default area for automatic statistical analysis;

S52. performing statistical and spatiotemporal analysis and evaluation of water quality parameter: automatically performing statistical analysis on water quality parameters, including a mean, maximum, minimum, and standard deviation of each water quality parameter to obtain statistical values of water quality. automatically performing spatiotemporal analysis to show temporal trends of water quality parameter statistics and the spatial differences of water quality parameter statistics in different regions; evaluating water quality according to national or local standards to generate a statistical chart.

Preferably, a specific process of the S6 is as follows:

S61. selecting the thematic map of water quality parameters generated in S4 and the statistical chart generated in the S5;

S62. choosing a report template: selecting from a plurality of provided report templates or uploading a custom template;

S63. schedule output: the user sets a scheduled task to automatically output report sheets at specified time on a daily, weekly, or monthly basis.

By adopting the above technical solution, the present disclosure has the following beneficial effects:

1. The present disclosure enables rapid and efficient automatic downloading of remote sensing images, and enhances the automation of whole-process processing through an effective retrieval and downloading mechanism.

2. Based on a machine learning approach, the present disclosure fuses high-spatial-resolution and low-temporal-resolution remote sensing data products with low-spatial-resolution and high-temporal-resolution remote sensing data products, supplements water quality parameter information as input to the machine learning model to generate a layer of high-frequency water quality parameter remote sensing products, and significantly improves the temporal and spatial resolutions of the products.

3. The present disclosure, to meet user-defined requirements, incorporates intelligent generation of thematic maps, intelligent statistical analysis, and automated report output, which further enhances the efficiency of the intelligent fusion and processing of data through remote sensing products for water quality monitoring of estuaries and bays.

DETAILED DESCRIPTIONS OF THE EMBODIMENTS

To make the objectives, technical solutions, and advantages of the present disclosure clearer and more comprehensible, a further detailed description of the present disclosure is made in conjunction with embodiments. It should be understood that the specific embodiments described herein are solely for the purpose of explaining the present disclosure and are not intended to limit its scope.

Figure 1:
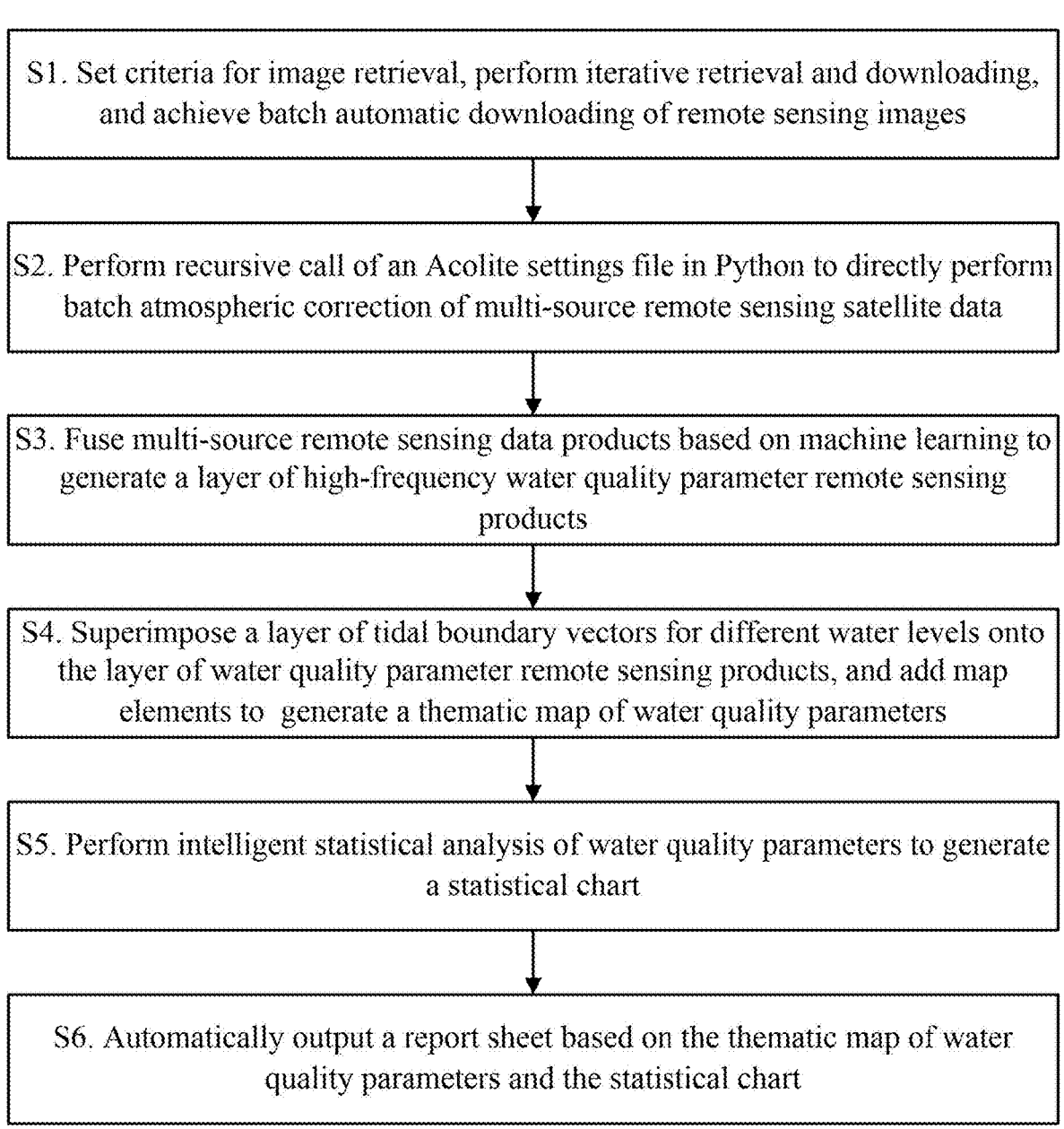
FIG. 1 is a flowchart of the present disclosure.
Figure 2:
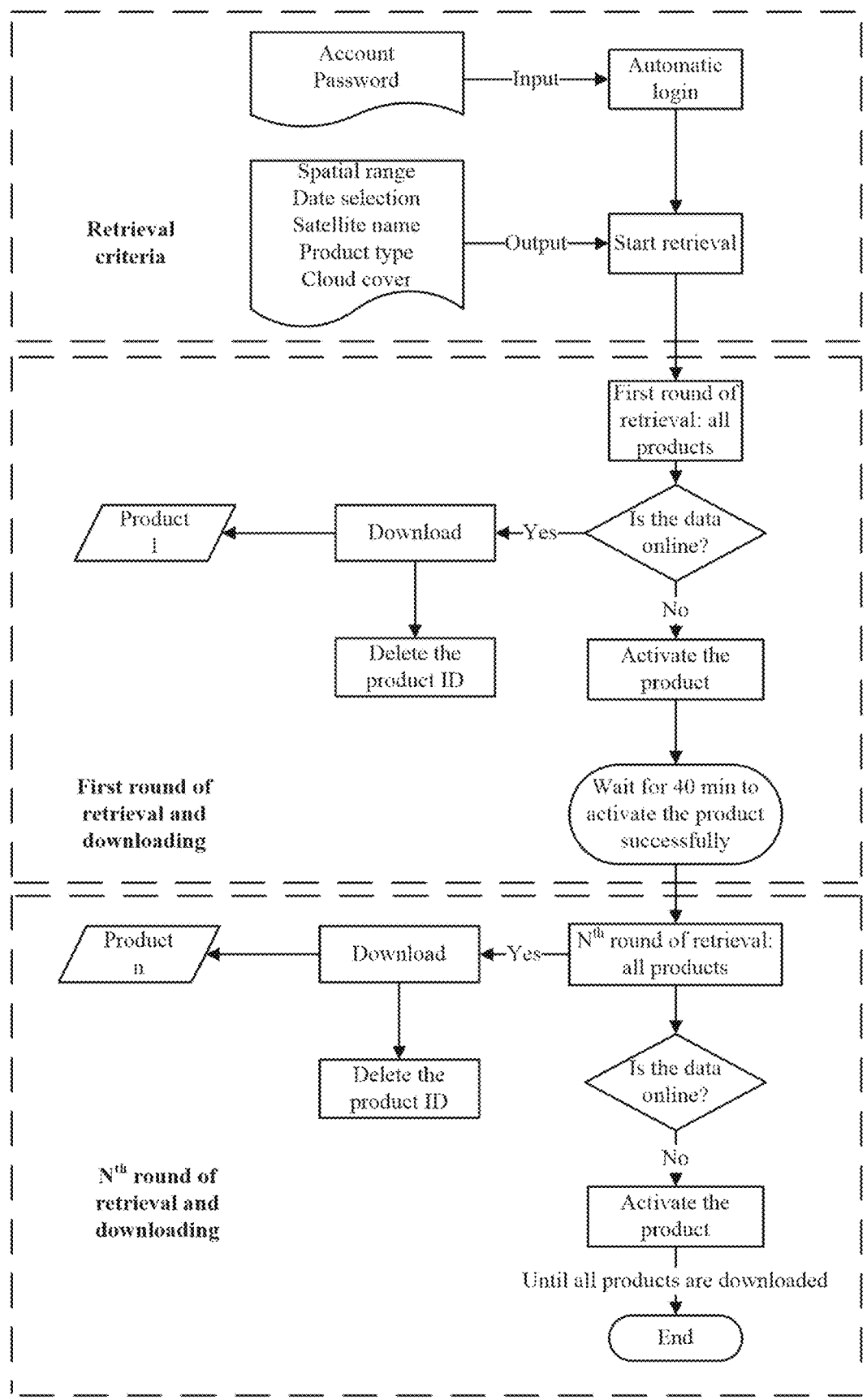
FIG. 2 is a flowchart of automatic batch downloading of remote sensing images in the present disclosure.

As shown in FIGS. 1 and 2, an intelligent fusion processing method for remote sensing products for water quality monitoring of estuaries and bays includes the following steps:

S1. set criteria for image retrieval, perform iterative retrieval and downloading, and achieve batch automatic downloading of remote sensing images.

a specific process of the S1 includes:

S11. set retrieval criteria: using Python and the Sentinelsat, Landsatxplore, and Selenium packages to batch download high spatial and temporal resolution multi-source remote sensing satellite data; the remote sensing satellite data is sourced from Sentinel-2, Sentinel-3, Landsat, GOCI2, and VIIRS; when logging into a download website automatically after inputting a valid account and password, a user can retrieve any required product according to the retrieval criteria;

in the S11: the spatial resolution of remote sensing data from Sentinel-2 is 10 m, with a temporal resolution of 5 d; the spatial resolution of remote sensing data from Sentinel-3 is 300 m, with a temporal resolution of 5 d; the spatial resolution of remote sensing data from Landsat is 30 m, with a temporal resolution of 16 d; the spatial resolution of remote sensing data from GOCI2 is 250 m, with an hourly temporal resolution; the spatial resolution of remote sensing data from VIIRS is 750 m, with a daily temporal resolution; the criteria for image retrieval include date, spatial region, satellite, product type, and cloud cover.

S12. perform iterative retrieval and downloading: the European Space Agency (ESA) employs a Long Term Archive (LTA) mechanism for Sentinel historical data to reduce server load, requiring activation before downloading. Historical data must be activated and then re-retrieved after a certain period. Therefore, a plurality of rounds of activation and downloading are required until all the necessary data are downloaded and the process is completed. During each round of retrieval and downloading, record the IDs of downloaded products. In a next round of downloading, remove the IDs of already downloaded products and retrieve and download from the IDs of offline products that have not been activated, to improve the overall efficiency of downloading in the whole process.

S2. perform recursive call of an Acolite settings file in Python to directly perform batch atmospheric correction of multi-source remote sensing satellite data.

The parameter settings in the settings file in S2 are as follows:

S21. select input: choose an input directory and files for processing;

S22. select output: choose an output directory;

S23. set an area of interest: enter boundaries to be processed and store them in a vector file in a shapefile format;

S24. set L2W parameters: list required output parameters. when the output parameters are null, only L1R and L2R files will be generated; select Rrs_*, i.e., output remote sensing reflectance;

S25. set a target resolution: set the resolution for each satellite;

S26. set whether to mask land areas, where by default, the land areas are masked;

S27. set wind speed-based interface reflectance correction: enabled;

S28. set residual sunlight reflectance correction: enabled;

S29. set PNG output: use top-of-atmosphere ρt or ρs reflectance to generate RGB composite checkboxes and L2W parameter PNG maps.

set an output FIG. resolution: 300 dpi;

set PNG map scale: enabled;

set PNG map scale color: white.

S3. fuse multi-source remote sensing data products based on machine learning to generate a layer of high-frequency water quality parameter remote sensing products.

a specific process of the S3 is as follows: use a machine learning method to fuse high-spatial-resolution and low-temporal-resolution remote sensing data products (e.g., Landsat with a spatial resolution of 30 m and a temporal resolution of 16 d) and low-spatial-resolution and high-temporal-resolution remote sensing data products (e.g., VIIRS with a spatial resolution of 750 m and a temporal resolution of daily); supplement water quality parameter information as input to the machine learning model to generate a layer of high-frequency water quality parameter remote sensing products, where the water quality parameter information includes a satellite angle, a wind speed, and an air temperature; the resulting layer of water quality parameter remote sensing products include turbidity, water temperature, chlorophyll-a, inorganic nitrogen, and reactive phosphate;

S4. superimpose a layer of tidal boundary vectors for different water levels onto the layer of water quality parameter remote sensing products, and add map elements to generate a thematic map of water quality parameters;

a specific process of S4 is as follows:

S41. match a tidal table according to time of shooting the remote sensing images, calculate water level heights corresponding to extracted high-tide, mid-tide, and low-tide boundaries; superimpose the tidal boundary vector layer onto the layer of water quality parameter remote sensing products;

S42. add map elements and other labels to generate a thematic map of water quality parameters for estuary and bay boundaries with higher accuracy, where the map elements include transportation networks, major administrative markers, scale bars, and north arrows.

S5. perform intelligent statistical analysis of water quality parameters to generate a statistical chart.

a specific process of the S5 is as follows:

S51. select an area of interest: the user selects the area of interest using GIS map tools or chooses a default area for automatic statistical analysis;

S52. perform statistical and spatiotemporal analysis and evaluation: automatically perform statistical analysis on water quality parameters, including a mean, maximum, minimum, and standard deviation of each water quality parameter to obtain statistical values; automatically perform spatiotemporal analysis to display the temporal trends of water quality parameter statistics and the spatial differences of water quality parameter statistics across different regions; evaluate water quality according to national or local standards to generate a statistical chart.

S6. automatically output a report sheet based on the thematic map of water quality parameters and the statistical chart.

a specific process of the S6 is as follows:

S61. select the thematic map of water quality parameters generated in the S4 and the statistical chart generated in the S5;

S62. choose a report template: select from a plurality of provided report templates or upload a custom template;

S63. schedule output: the user sets a scheduled task to automatically output report sheets at specified time on a daily, weekly, or monthly basis.

The above description is merely a preferred specific embodiment of the present disclosure. However, the scope of protection of the present disclosure is not limited thereto. Any variations or substitutions readily conceived by those skilled in the art within the technical scope disclosed in the present disclosure should fall within the scope of protection of the present disclosure. Therefore, the scope of protection of the present disclosure shall be subject to the scope of the claims.

What is claimed is:

1. An intelligent fusion and processing method for remote sensing products for water quality monitoring of estuaries and bays, comprising the following steps:

S1: setting criteria for image retrieval, performing iterative image retrieval and downloading, and achieving batch downloading of remote sensing images automatically;

a specific process of the S1 is as follows:

S11: setting criteria for image retrieval: using Python and Sentinelsat, Landsatxplore, and Selenium packages to batch download high spatial- and temporal-resolution multi-source remote sensing satellite data; the remote sensing satellite data comes from Sentinel-2, Sentinel-3, Landsat, GOCI2, and VIIRS; when logging into a download website automatically after inputting a valid account and password, a user can retrieve any required product according to the retrieval criteria;

S12: performing iterative retrieval and downloading: performing a plurality of rounds of activation and downloading until all the required data are downloaded, and then terminating the process; for each round of retrieval and downloading, recording IDs of downloaded products, and in a next round of downloading, removing the IDs of already downloaded products, and retrieving and downloading from the IDs of offline products that have not been activated;

S2: performing recursive call of an Acolite settings file in Python to directly perform batch atmospheric correction of multi-source remote sensing satellite data;

a specific process of setting parameters in the settings file in the S2 is as follows:

S21: selecting input: choosing an input directory and files for processing;

S22: selecting output: choosing an output directory;

S23: setting an area of interest: entering boundaries to be processed and storing them in a vector file in a shapefile format;

S24: setting L2W parameters: listing required output parameters; when the output parameters are null, only L1R and L2R files will be generated; choosing Rrs_*, to output remote sensing reflectance;

S25: setting a target resolution: setting the resolution for each satellite;

S26: setting whether to mask land areas: by default, the land areas are masked;

S27: setting a status of wind speed-based interface reflectance correction to: on;

S28: setting a status of residual sunlight reflectance correction to: on;

S29: setting PNG output: using top-of-atmosphere ρt or ρs reflectance to generate RGB composite checkboxes and L2W parameter PNG maps;

setting an image resolution: 300 dpi;

setting whether to include a PNG map scale: yes;

setting a PNG map scale color: white;

S3: fusing multi-source remote sensing data products based on machine learning to generate a layer of high-frequency water quality parameter remote sensing products;

a specific process of the S3 is as follows: based on machine learning, fusing high-spatial-resolution and low-temporal-resolution remote sensing data products with low-spatial-resolution and high-temporal-resolution remote sensing data products, supplementing this with water quality parameter information as input to the machine learning model to generate a layer of high-frequency water quality parameter remote sensing products, wherein the water quality parameter information includes a satellite angle, a wind speed, and an air temperature, and the layer of water quality parameter remote sensing products include turbidity, water temperature, chlorophyll-a, inorganic nitrogen, and reactive phosphate;

S4: superimposing a layer of tidal boundary vectors for different water levels onto the layer of water quality parameter remote sensing products, and adding map elements to generate a thematic map of different water quality parameters;

a specific process of the S4 is as follows:

S41: matching a tidal table according to time of shooting the remote sensing images, calculating water level heights corresponding to extracted high tide, mid-tide, and low tide boundaries, superimposing the tidal boundary vector layer onto the layer of water quality parameter remote sensing products;

S42: adding map elements and other labels to generate a thematic map of water quality parameters for estuary and bay boundaries, where the map elements include transportation networks, major administrative markers, scale bars, and north arrows;

S5: performing intelligent statistical analysis of water quality parameters to generate a statistical chart;

a specific process of S5 is as follows:

S51: selecting an area of interest: the user selects the area of interest using GIS map tools or chooses a default area for automatic statistical analysis;

S52: performing statistical and spatiotemporal analysis and evaluation of water quality parameters: automatically performing statistical analysis on water quality parameters, including a mean, maximum, minimum, and standard deviation of each water quality parameter, to obtain statistical values of water quality parameters; automatically performing spatiotemporal analysis to show temporal trends of water quality parameter statistics and spatial differences of water quality parameter statistics in different regions; evaluating water quality according to national or local standards to generate a statistical chart;

S6: automatically outputting a report sheet based on the thematic map of water quality parameters and the statistical chart;

a specific process of the S6 is as follows:

S61: selecting the thematic map of water quality parameters generated in the S4 and the statistical chart generated in the S5;

S62: choosing a report template: selecting from a plurality of provided report templates or uploading a custom template;

S63: schedule output: the user sets a scheduled task to automatically output report sheets at specified time on a daily, weekly, or monthly basis.

2. The intelligent fusion and processing method for remote sensing products for water quality monitoring of estuaries and bays according to claim 1, wherein in the S11, the spatial resolution of remote sensing satellite data from Sentinel-2 is 10 m, with a temporal resolution of 5 d; the spatial resolution of remote sensing satellite data from Sentinel-3 is 300 m, with a temporal resolution of 5 d; the spatial resolution of remote sensing satellite data from Landsat is 30 m, with a temporal resolution of 16 d; the spatial resolution of remote sensing satellite data from GOCI2 is 250 m, with a temporal resolution of being hourly; the spatial resolution of remote sensing satellite data from VIIRS is 750 m, with a temporal resolution of daily; the criteria for image retrieval include date, spatial region, satellite, product type, and cloud cover.

* * * * *